United States Patent
McFarland

(10) Patent No.: US 8,555,819 B1
(45) Date of Patent: Oct. 15, 2013

(54) PET BATHING BRUSH WITH HOSE ATTACHMENT

(76) Inventor: Jeffrey A. McFarland, Grandville, MI (US)

( * ) Notice: Subject to any disclaimer, the term of this patent is extended or adjusted under 35 U.S.C. 154(b) by 0 days.

(21) Appl. No.: 13/439,262

(22) Filed: Apr. 4, 2012

(51) Int. Cl.
*A01K 13/00* (2006.01)

(52) U.S. Cl.
USPC .......................................... 119/603; 119/664

(58) Field of Classification Search
USPC ......... 119/603, 604, 600, 601, 602, 612, 664; 15/320, 321, 322; 132/114
See application file for complete search history.

(56) References Cited

U.S. PATENT DOCUMENTS

| | | | |
|---|---|---|---|
| 3,271,809 A | 9/1966 | Morawski | |
| 3,574,885 A | 4/1971 | Jones | |
| 4,027,984 A | 6/1977 | Underwood | |
| 4,236,840 A * | 12/1980 | Kennedy | 401/42 |
| 4,254,738 A | 3/1981 | Stanley | |
| 4,543,913 A * | 10/1985 | Wilkeson | 119/603 |
| 4,799,456 A * | 1/1989 | Young | 119/603 |
| 4,922,859 A * | 5/1990 | Durell et al. | 119/603 |
| 5,109,553 A | 5/1992 | Kishimoto | |
| D331,840 S | 12/1992 | Garner | |
| 5,348,409 A | 9/1994 | Newman, Sr. et al. | |
| D356,442 S | 3/1995 | Hayes et al. | |
| D375,588 S | 11/1996 | Bzoch | |
| 5,823,145 A * | 10/1998 | Hingiss | 119/603 |
| 6,024,052 A * | 2/2000 | Efaw | 119/625 |
| 6,367,421 B1 * | 4/2002 | Deacon | 119/603 |
| 6,439,790 B1 | 8/2002 | Kay | |
| 6,718,913 B1 * | 4/2004 | Stupar | 119/602 |
| 6,948,451 B2 * | 9/2005 | Bond et al. | 119/665 |
| 7,509,925 B2 * | 3/2009 | Embry | 119/603 |
| 7,837,403 B2 * | 11/2010 | Willinger et al. | 401/184 |
| 8,082,887 B2 * | 12/2011 | Fernandez | 119/612 |
| 2006/0174842 A1 * | 8/2006 | Bond et al. | 119/664 |

* cited by examiner

*Primary Examiner* — Yvonne Abbott
(74) *Attorney, Agent, or Firm* — Montgomery Patent & Design; Robert C. Montgomery

(57) ABSTRACT

A pet bathing brush with a hose attachment to aid in bathing pets comprises a massaging brush and a control valve. The brush comprises a gripping handle and is preferably constructed of a pliable hard rubber compound and further comprises a plurality of conical scrubbing protrusions along a bottom surface. The bottom surface further includes a plurality of water apertures which enable water to pass through the bottom surface onto the pet. Water is provided to an interior space of the brush by an attachable hose. Additionally, the brush provides storage and dispensing of a cleanser via an internal reservoir. As a pet is washed, the user can massage the pet with the protrusions while allowing a flow of water to pass through the bottom surface while simultaneously dispensing the cleanser from a nozzle also located along the bottom surface to effectively bathe the pet.

14 Claims, 5 Drawing Sheets

PET BATHING BRUSH WITH HOSE ATTACHMENT

RELATED APPLICATIONS

There are currently no applications co-pending with the present application.

FIELD OF THE INVENTION

The present invention relates generally to a bathing brush implement for removable attachment to a water supply hose.

BACKGROUND OF THE INVENTION

Keeping pets is a time-consuming task, requiring one to constantly feed, groom, and clean up after their animal friends. Those who own pets know the importance of frequent bathing to keep their pet's coat healthy, clean, and fresh smelling. For this bathing process, many take their pets to pet grooming salons. Others may bathe their pet in a sink or bathtub while others bathe their pet outside. However, no matter the bathing method or location, it is always important to properly massage the pet's fur to help loosen dead skin, hair, and dander. It is also very important to provide for a proper rinsing to remove all traces of dirt and shampoo as well. Accordingly, there exists a need for a means by which pets can be easily and thoroughly bathed.

Various attempts have been made to provide a means for bathing and scrubbing an animal. Examples of these attempts can be seen by reference to several U.S. patents. U.S. Pat. No. 3,271,809, issued in the name of Morawski, describes a fountain brush with a soap reservoir and valve. Unfortunately, the Morawski device does not provide pressure bulbs conveniently located on the lid to propel the cleanser through the nozzle, nor does it describe such a nozzle having an integral drip valve.

U.S. Pat. No. 4,027,984, issued in the name of Underwood, describes a shampoo brush comprising a container for a cleaning agent with a pair of one-way spring-loaded plungers. The plungers must act in concert with each other to dispense an amount of cleaning agent while the other plunger opens to receive an amount of cleaning agent to be dispensed on a second actuation. This actuation means is more complicated and not as convenient as the present pressure bulbs located in the lid of the brush.

U.S. Pat. No. 4,236,840, issued in the name of Kennedy, describes an internal reservoired soap dispensing animal washer wherein the reservoirs are constantly under pressure due to a back pressure chamber in the head of the brush and further has vortex chambers to mix incoming water with the soap. This means is more complicated and comprises different features not necessary with the present invention, which only requires selectable dispensing of either the water or cleanser.

U.S. Pat. No. 5,109,553, issued in the name of Kishimoto, describes a shower utensil with a brush. Unfortunately, the Kishimoto invention does not comprise a centrally located lid providing a gripping means and a pair of pressure bulbs for propelling the cleanser through the nozzle.

U.S. Pat. No. 6,439,790, issued in the name of Kay, discloses a brush providing a user to dispense liquid soap onto a brush head. Unfortunately, similar to the Kishimoto invention, Kay does not comprise a centrally located lid providing a gripping means and a pair of pressure bulbs for propelling the cleanser through the nozzle. Further, the Kay invention cannot be connected to a water source as taught in the present invention.

While these devices fulfill their respective, particular objectives, each of these references suffer from one (1) or more disadvantages. Many such devices are not suited to easily and quickly adapt to be connected to a water source such as a spigot or shower plumbing fitting and comprising a water flow control means and a cleanser dispensing means. Accordingly, there exists a need for such a pet bathing brush. The development of the present invention substantially departs from the conventional solutions and in doing so fulfills this need.

SUMMARY OF THE INVENTION

The inventor has recognized the aforementioned inherent problems and lack in the art and observed that there is a need for such a pet bathing brush.

To achieve the above objectives, it is an object of the present invention to provide a pet bathing brush having an internal chamber for receiving water for subsequent dispensing, an internal reservoir for holding an amount of cleanser for subsequent dispensing, a lid for capping the reservoir and providing a propelling means for the cleanser, a plurality of protrusions for providing a scrubbing means, a connection means for a water source, and a control means for controlling the amount of water flowing from the water source to the brush.

Another object of the present invention is to provide such a brush having a top and bottom surface, a pair of first sidewalls, and a pair of second sidewalls. The plurality of protrusions each depends downward from the bottom surface. A plurality of apertures is also located on the bottom surface and in fluid communication with the internal chamber. An attachment nipple is in fluid communication with the internal chamber and extends outwardly from one of the sidewalls. The attachment nipple removably attaches the control valve.

Yet still another object of the present invention is to comprise the lid for providing a removable cap to the internal reservoir. The lid further has a head and a hollow neck having a pair of pressure bulbs to hydraulically propel the contents of the reservoir through the dispenser. In at least one (1) embodiment, the dispenser comprises a nozzle having an integral drip valve.

Yet still another object of the present invention is to provide the means for connecting to be a hose having a proximal end removably attached to the control valve. In at least one (1) embodiment, there is an adapter that provides a removable attachment for a distal end of the hose to the water source.

Yet still another object of the present invention is to provide the control valve to be a ball valve.

In at least one (1) embodiment of the present invention, each of the plurality of protrusions is conical-shaped.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

| DESCRIPTIVE KEY | |
| --- | --- |
| 10 | pet bathing brush with hose attachment |
| 20 | brush assembly |
| 22 | brush body |
| 23 | water chamber |
| 24 | brush handle |
| 26 | handle neck |
| 28a | first pressure bulb |
| 28b | second pressure bulb |
| 30 | bottom surface |
| 32 | protrusion |
| 34 | water aperture |
| 35 | reservoir |
| 36 | cleanser |
| 38 | cleanser tube |
| 40 | nozzle |
| 41 | drip valve |
| 42 | first female threaded member |
| 44 | first male threaded member |
| 46 | second male threaded member |
| 50 | control valve assembly |
| 52 | valve body |
| 54 | valve handle |
| 55 | valving member |
| 56 | second female threaded member |
| 58 | third female threaded member |
| 70 | hose assembly |
| 72 | hose |
| 76 | third male threaded member |
| 78 | fourth female threaded member |
| 80 | adapter assembly |
| 82 | fourth male threaded member |
| 84 | fifth female threaded member |
| 100 | carrying case |
| 102 | lower case body |
| 104 | first foam insert |
| 105a | first cavity |
| 105b | second cavity |
| 105c | third cavity |
| 105d | fourth cavity |
| 106 | lid |
| 107 | second foam insert |
| 108 | hinge |
| 110a | first latching mechanism |
| 110b | second latching mechanism |
| 150 | pet |
| 155 | spigot |

DETAILED DESCRIPTION OF THE PREFERRED EMBODIMENT

The best mode for carrying out the invention is presented in terms of its preferred embodiment, herein depicted within FIGS. 1 through 5, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
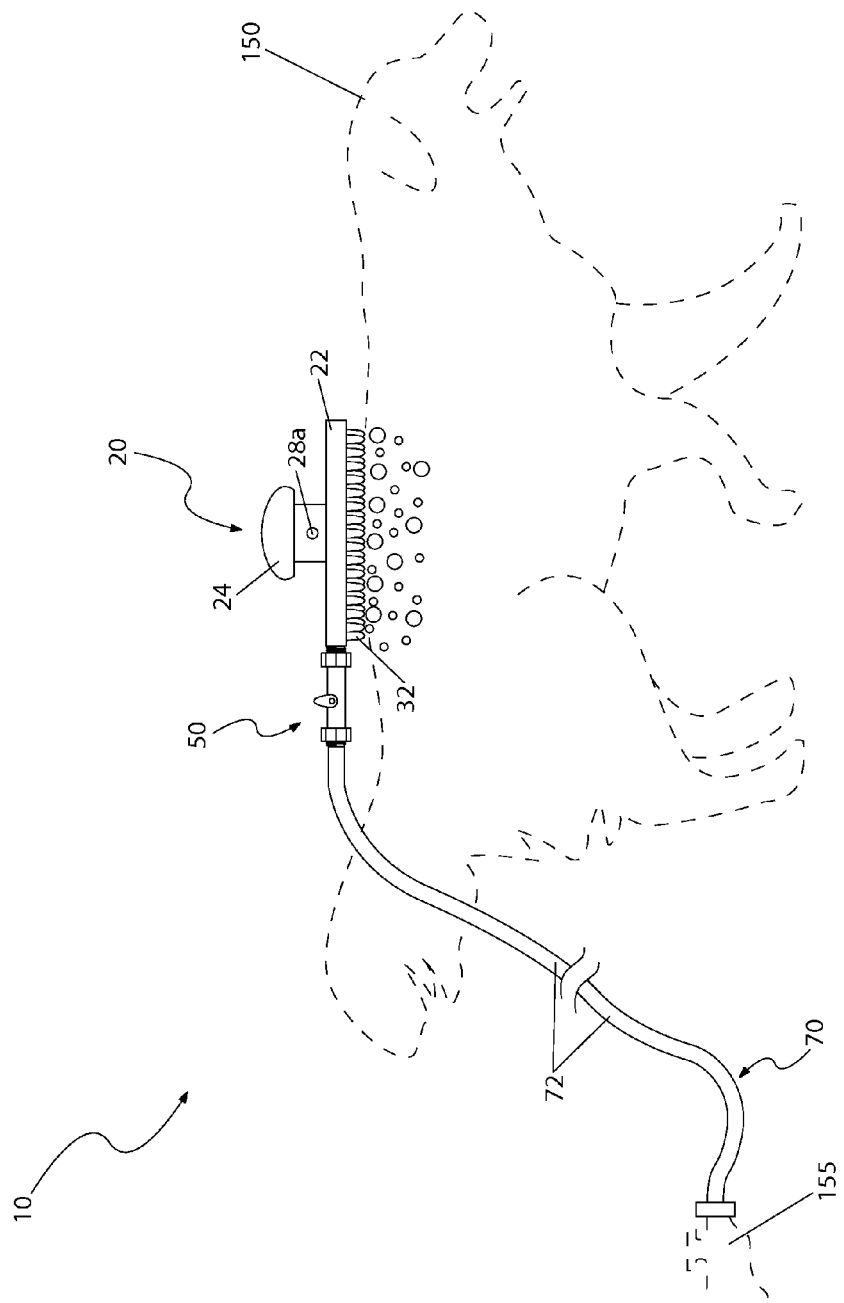
FIG. 1 is an environmental view of a pet bathing brush with hose attachment 10 depicting an in-use state, according to a preferred embodiment of the present invention.

Referring now to FIG. 1, an environmental view of a pet bathing brush with a hose attachment (herein described as the "apparatus") 10, depicting an in-use state, according to a preferred embodiment of the present invention, is disclosed. The apparatus 10 provides an aid in the bathing of pets 150 and comprises a rectangular or ovular-shaped hand-held massaging brush 20 approximately four inches (4 in.) in length and two and one-half inches (2½ in.) in width; however, it is understood that other overall sizes of the apparatus 10 particularly suited for larger and smaller pets may also be introduced. The apparatus 10 provides such convenience features as a palm-type brush handle 24, an internal cleanser reservoir 35, a water control valve 50, and a hose assembly 70 which allows connection to shower plumbing or to a common spigot 155. In such a manner the pet 150 is washed and massaged while a supply of water mixed with cleanser 36 is emitted from a bottom surface of the apparatus 10. These features allow for the complete and thorough bathing of a pet 150, as well as minimizing or eliminating a need for brushing the pet 150 following bathing.

Figure 2:
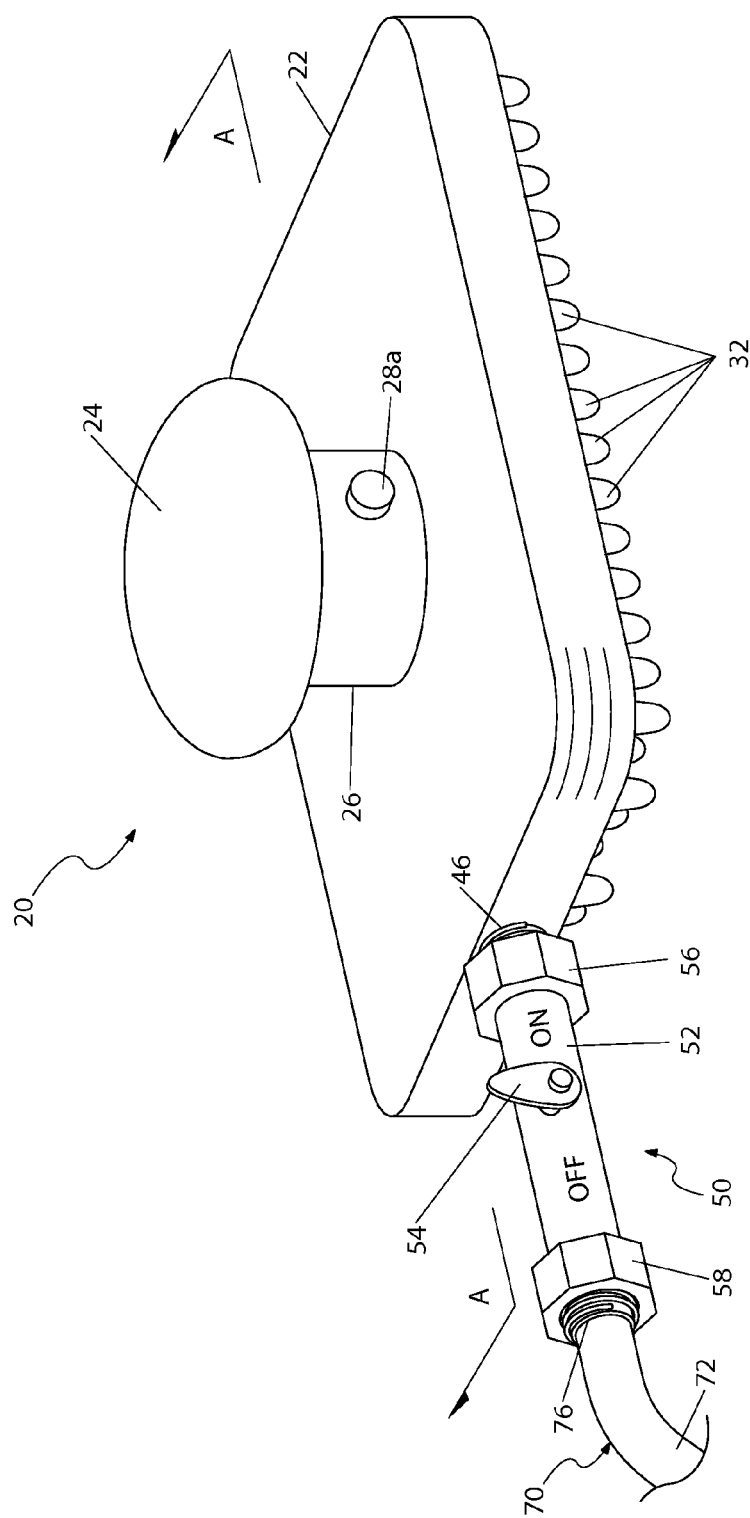
FIG. 2 is a front perspective view of the pet bathing brush with hose attachment 10, according to a preferred embodiment of the present invention.
Figure 3:
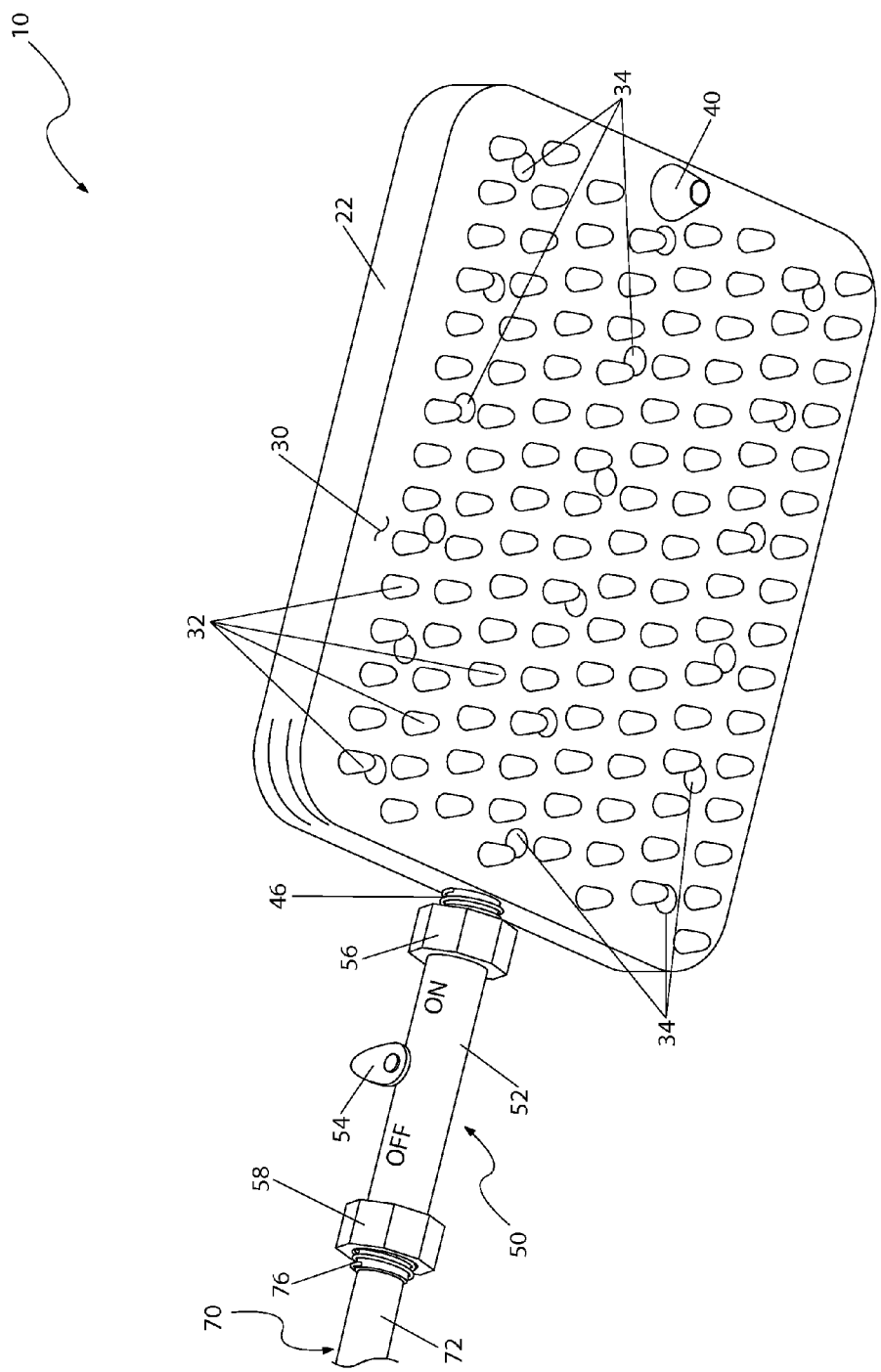
FIG. 3 is a bottom perspective view of the pet bathing brush with hose attachment 10, according to a preferred embodiment of the present invention.

Referring now to FIGS. 2 and 3, front and bottom perspective views of the apparatus 10, according to a preferred embodiment of the present invention, are disclosed. The apparatus 10 comprises a brush assembly 20, a control valve assembly 50, and a water supply hose assembly 70. The brush assembly portion 20 of the apparatus 10 comprises a hollow brush body portion 22 made using a hard rubber compound and further comprising a plurality of conical-shaped protrusions 32 which extend downwardly from an entire bottom surface 30. Each protrusion 32 is approximately five-sixteenths (5/16 in.) of an inch long. Also provided along the bottom surface 30 of the apparatus 10 is a plurality of equally-spaced water apertures 34 arranged along parallel rows which allow for the passage of water from the hollow brush body 22 onto the pet 150 (see FIG. 4).

The apparatus 10 comprises a removably attachable brush handle 24 intermediately located upon a top surface of the brush body 22. Said brush handle 22 comprises a large spherical or dome-shaped grasping means providing a threaded attachment means to said brush body 22 via an integral cylindrical neck portion 26. Said brush handle 24 enables a user to securely hold and maneuver the brush assembly 20 upon a pet 150 with dry or even wet and slippery hands. Said brush handle 24 and neck 26 portions are threadingly detachable from the brush body 22 to reveal and access an internal reservoir 35 which may in turn be filled with a pet-washing-type cleanser 36. Furthermore, said neck portion 26 comprises an integral rubber first pressure bulb 28a and second pressure bulb 28b, both of which provide a means to hydraulically propel said cleanser 36 from a bottom-mounted nozzle portion 40. Said first 28a and second 28b pressure bulbs are arranged along right-side and left-side surfaces of the handle neck 26 to provide convenient access to both right-handed and left-handed users (also see FIG. 4).

Figure 4:
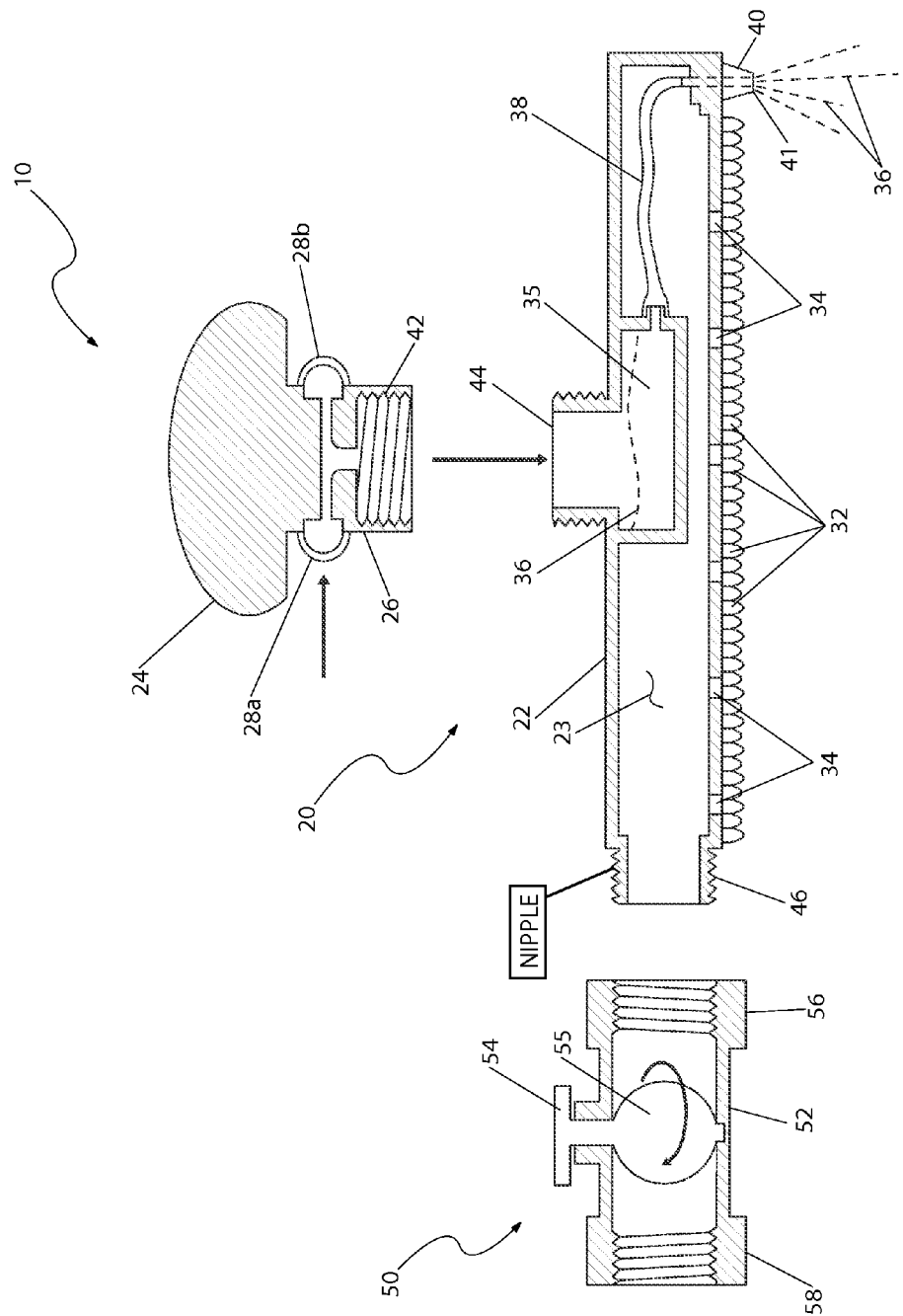
FIG. 4 is an exploded section view of the pet bathing brush with hose attachment 10 taken along section line A-A (see FIG. 2), according to a preferred embodiment of the present invention; and, FIG. 5 is a perspective view of a kit form of the pet bathing brush with hose attachment 10, according to a preferred embodiment of the present invention.

Referring now to FIG. 4, an exploded section view of the apparatus 10 taken along section line A-A (see FIG. 2), according to a preferred embodiment of the present invention, is disclosed. Water is supplied to the apparatus 10 via the hose assembly 70, which is in turn controlled via the control valve assembly 50. Said water is then received into a hollow water chamber portion 23 within the brush assembly 20 before being emitted from said water apertures 34 onto the pet 150.

Along with the flow of water, the apparatus 10 provides a means to store, propel, and dispense a cleanser 36 onto the pet 150 in a simultaneous manner. The aforementioned brush handle 24 and neck 26 portions act as a threaded capping means to access an internal cleanser reservoir 35 within the brush body 22. Said neck 26 and brush body 22 comprise respective first female threaded member 42 and first male threaded member 44 portions. Removal of said brush handle 24 provides access to the internal cleanser reservoir 35 which is to be capable of retaining a sufficient volume of cleanser 36 being appropriate for the washing of a pet 150. The brush assembly 20 provides a means to convey said cleanser 36 from the reservoir 35 to the aforementioned nozzle 40 via an interconnecting cleanser tube 38. Once the brush handle 24 is threadingly replaced upon said brush body 22, said cleanser 36 is propelled through the cleanser tube 38 and nozzle portions 40 by pressing upon either pressure bulb 28a, 28b located upon the side surfaces of the neck portion 26. Said pressure bulbs 28a, 28b comprise hemi-spherical-shaped rubber buttons being convenient to both a right-handed and left-handed user's finger portions, thereby providing easy activation. The nozzle 40 is envisioned to comprise a conical-shaped rubber form which protrudes downwardly from the bottom surface 30, being similar in length as the aforementioned protrusions 32. Said nozzle 40 further comprises an integrally-molded drip valve feature 41 at a lower end portion. Said drip valve 41 is envisioned to comprise a pair of crossing slit features being similar to those commonly used on condiment bottles to control dripping of fluids.

The brush assembly 20 provides an attachment means to the control valve assembly 50 via threaded engagement of respective second male threaded member 46 and second female threaded member 56 portions envisioned to comprise a diameter of approximately one-half inch (½ in.) to three-quarters of an inch (¾ in.). Said control valve assembly 50 further comprises a valve body 52, a quarter-turn valve handle 54, a flat or spherical internal fluid-metering valving member 55, and a third female threaded member 58 being opposite the aforementioned second female threaded member 56. Said control valve assembly 50 is envisioned to comprise a common linear plastic-bodied ball valve or equivalent flow control device having female threaded end portions. Said third female threaded member 58 of the control valve assembly 50 provides threaded attachment to the hose assembly 70, thereby allowing a user to connect the apparatus 10 to existing water sources such as shower plumbing fittings or an outdoor spigot 155 (see FIGS. 1, 2, and 5).

Figure 5:
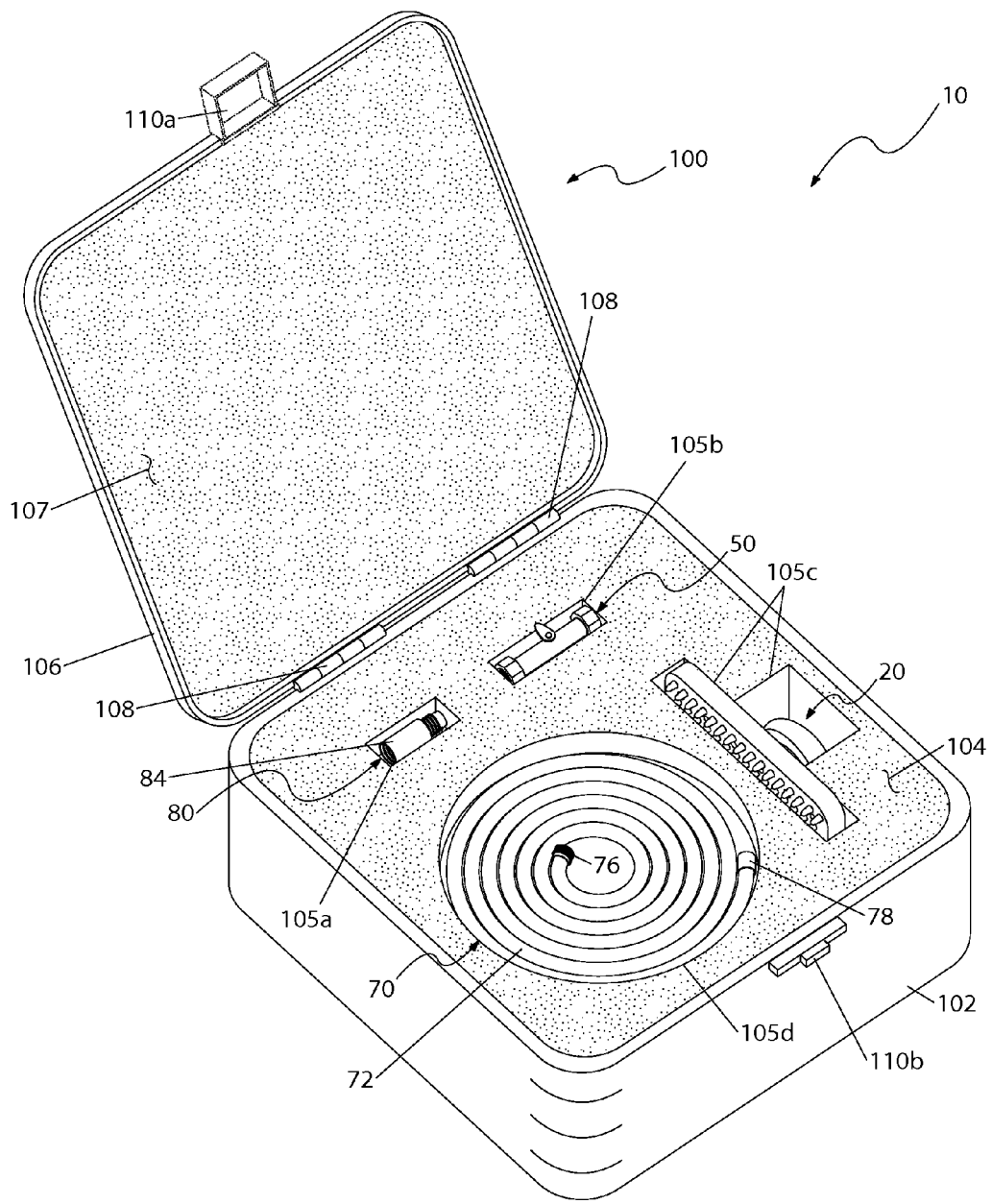

Referring now to FIG. 5, a perspective view of a carrying case portion 100 of the apparatus 10, according to a preferred embodiment of the present invention, is disclosed. The apparatus 10 is envisioned to be conveniently, compactly, and protectively stored within a carrying case 100. Said carrying case 100 resembles a standard metal or plastic brief case and further comprises a lower case body 102 having a first foam rubber insert 104, a matching lid 106 having a second foam insert 107, a pair of joining hinges 108, and a two-part latching mechanism 110a, 110b. Said first foam insert 104 further comprises a plurality of cavities 105a, 105b, 105c, 105d which match a shape of each of the major portions 20, 50, 70 of the apparatus 10, thereby providing snug protective containment for possible transportation of the apparatus 10.

The apparatus 10 provides a means of attachment to existing shower head plumbing or to a spigot 155 via the hose assembly 70. Said hose assembly 70 comprises a length of flexible rubber or plastic garden hose approximately eight feet (8 ft.) in length having a third male threaded member 76 at one (1) end portion and a fourth female threaded member 78 at an opposite end portion in a conventional manner. Additionally, the carrying case 100 is illustrated here containing an adapter assembly 80 which provides a means to attach said hose assembly 80 to an existing shower plumbing fitting. Said adapter assembly 80 comprises a common commercially-available plumbing fitting having a fourth male threaded member 82 at one (1) end portion and a fifth female threaded member 84 at an opposing end portion, thereby enabling connection to respective fourth female threaded member 78 of the hose assembly 70, and a typical existing male-threaded shower fitting.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be assembled and utilized as indicated in FIG. 1.

The method of installing and assembling the apparatus 10 may be achieved by performing the following steps: procuring a model of the apparatus 10 having an appropriately sized brush assembly 20 based upon a particular pet 150 to be washed; opening the carrying case 100 and removing the components of the apparatus 10; assembling the brush assembly 20 to the control valve assembly 50 by threadingly connecting the second male threaded member portion 46 of said brush assembly 20 to the second female threaded member portion 56 of said control valve assembly 50; assembling the control valve assembly 50 to the hose assembly 70 by threadingly connecting the third female threaded member portion 58 of said control valve assembly 50 to the third male threaded member 76 of said hose assembly 70; and, attaching the hose assembly 70 to an existing water source by connecting the fourth female threaded member portion 78 of the hose assembly 70 to a standard spigot 155. The apparatus 10 is now ready to be utilized to wash and/or groom a pet 150.

The method of utilizing the apparatus 10 to wash the pet 150 would be achieved by performing the following additional steps: removing the brush handle 24 from the brush body 22 by threading respective threaded members 42, 44; pouring a desired volume of cleanser 36 into the reservoir portion 35 of the brush body 22; replacing the brush handle 24; turning the control valve handle 54 to an "OFF" position; activating a flow of supply water to the apparatus 10 by activating the spigot 155 in a normal manner; grasping the brush handle 24 firmly; opening the control valve assembly 50 using the valve handle 54 until obtaining a desired flow rate of water out of the water apertures 34; applying water upon the pet 150 by placing the brush assembly 20 onto a desired portion of the pet 150 until thoroughly wetted; applying and mixing a flow of cleanser 36 onto the pet 150 as desired by pressing a pressure bulb 28a, 28b using a "pumping motion" until a desired amount of cleanser 36 is dispensed from the nozzle 40 upon the pet 150; continuing to regulate the flow of water using the control valve handle 54 to obtain a desired mixture of water and cleanser 36; scrubbing the pet by motioning the protrusion portions 32 of the brush assembly 20 over the pet 150 as needed to wash the pet 150; rinsing the pet 150 by utilizing the control valve assembly 50 to provide a desired flow of water to rinse all soil and cleanser 36 from said pet 150; halting the flow of water by closing the valve handle 54 and spigot 155; disassembling and draining the apparatus 10 by threadingly detaching the previously described threaded members 46, 56, 58, 76, 78; returning all major components of the apparatus 10 to the appropriate cavities 105 within the carrying case 100; and, benefiting from a convenient and effective means to wash a pet 150 afforded a user of the present invention 10.

If a user desires to wash the pet 150 indoors, the adapter assembly 80 may be utilized to establish a threaded connection between the hose assembly 70 and an existing male threaded portion of a shower fitting, thereby establishing a pressurized water supply to the apparatus 10. Utilization of the apparatus 10 to wash the pet 150 would then be performed in an identical manner as previously described above.

The features of the apparatus 10 allow for the complete and thorough bathing of the pet 150, as well as minimizing or eliminating a need for brushing the pet 150 following bathing.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pet bathing brush, comprising:
   a hollow brush, comprising an internal chamber, a bottom side, a top side, a pair of first sidewalls, a pair of second sidewalls, and a plurality of protrusions attached to and depending downwardly from said bottom surface;
   an internal reservoir located within said brush, comprising a fill aperture centrally located on said upper surface;
   a lid removably attached to said fill aperture, comprising a grasping head and a neck having a hollow interior connected to said grasping head;
   a dispenser in fluid communication with said internal reservoir;
   a plurality of apertures located on a bottom surface of said brush, each in fluid communication with said internal chamber;
   a nipple extending outwardly from one of said pair of first sidewalls in fluid communication with said internal chamber;
   a pair of pressure bulbs located on diametrically opposing outer surfaces of said neck, each in fluid communication with said neck hollow interior; and,
   a control valve connected to and providing a fluid communication between said means for connecting and said attachment nipple;
   wherein said internal reservoir is adapted to receive an amount of a cleanser;
   wherein said lid is adapted to provide a gripping capacity for manipulation of said brush;
   wherein depression of either or both of said pressure bulbs propels an amount of said cleanser within said reservoir through said dispenser; and,
   wherein said control valve controls an amount of water from said water source to said brush and through said plurality of apertures.

2. The brush of claim 1, wherein said plurality of protrusions each further comprises a downwardly depending conical shape.

3. The brush of claim 1, wherein said means for connecting is an elongated flexible hose, comprising a proximal end connected to said control valve and a distal end.

4. The brush of claim 3, further comprising an adapter for connecting said distal end of said hose to said water source.

5. The brush of claim 1, wherein said control valve is a ball valve.

6. The brush of claim 1, wherein said dispenser further comprises a nozzle.

7. The brush of claim 6, wherein said nozzle further comprises an integral drip valve.

8. A pet bathing brush, comprising:
   a hollow brush, comprising an internal chamber, a bottom side, a top side, a pair of first sidewalls, a pair of second sidewalls, and a plurality of protrusions attached to and depending downwardly from said bottom surface;
   an internal reservoir located within said brush, comprising a fill aperture centrally located on said upper surface;
   a lid removably attached to said fill aperture;
   a dispenser in fluid communication with said internal reservoir;
   a plurality of apertures located on a bottom surface of said brush, each in fluid communication with said internal chamber;
   a nipple extending outwardly from one of said pair of first sidewalls in fluid communication with said internal chamber;
   a control valve connected to and providing a fluid communication between said means for connecting and said attachment nipple;
   an elongated flexible hose, comprising a proximal end connected to said control valve and a distal end;
   an adapter for connecting said distal end of said hose to said water source; and,
   a carrying case adapted to receive said brush and said means for connecting, comprising:
      a five-sided enclosure having an interior;
      a lid hingedly attached to an upper edge of a rear wall and securely attached to an upper edge of a front wall; and,
      a deformable impact insulating material filling said interior, further comprising a first receiver correspondingly sized to store said brush, a second receiver correspondingly sized to store said hose; and a third receiver correspondingly sized to store said adapter;
   wherein said internal reservoir is adapted to receive an amount of a cleanser;
   wherein said lid is adapted to provide a gripping capacity for manipulation of said brush;
   wherein said lid comprises a means to propel said cleanser through said dispenser; and,
   wherein said control valve controls an amount of water from said water source to said brush and through said plurality of apertures.

9. The brush of claim 8, wherein said plurality of protrusions each further comprises a downwardly depending conical shape.

10. The brush of claim 8, wherein said control valve is a ball valve.

11. The brush of claim 8, wherein said lid further comprises a grasping head and a neck having a hollow interior connected to said grasping head;

wherein said neck removably attaches said lid to said fill aperture.

12. The brush of claim 11, wherein said means to propel said cleanser is a pair of pressure bulbs located on diametrically opposing outer surfaces of said neck, each in fluid communication with said neck hollow interior;

wherein depression of either or both of said pressure bulbs propels an amount of said cleanser within said reservoir through said dispenser.

13. The brush of claim 12, wherein said dispenser further comprises a nozzle.

14. The brush of claim 13, wherein said nozzle further comprises an integral drip valve.

\* \* \* \* \*